March 26, 1957 J. B. McKINLEY ET AL 2,786,801
FLUID CONTACTING PROCESS INVOLVING FLUIDIZED PARTICLES
Filed April 4, 1952
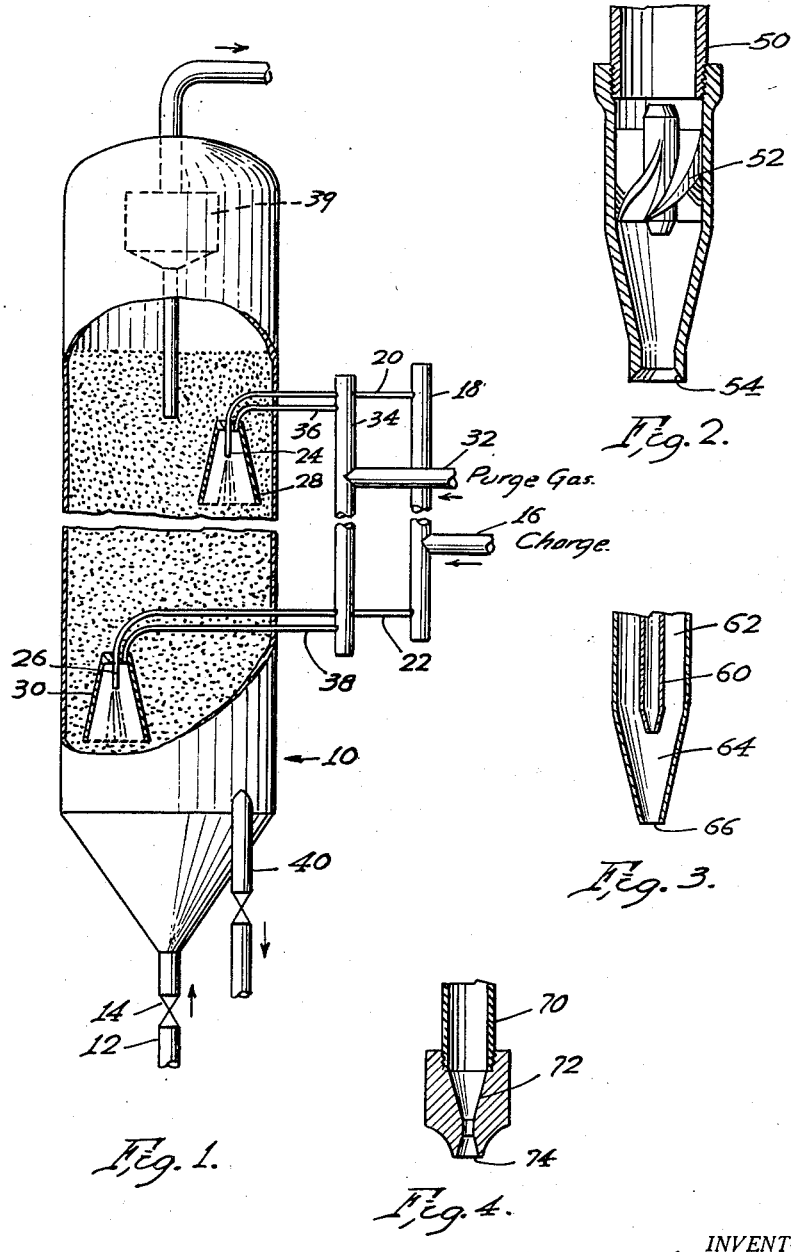
INVENTORS.
Joseph B. McKinley and
Michael J. Derrig.
BY
ATTORNEY

United States Patent Office 2,786,801
Patented Mar. 26, 1957

2,786,801

FLUID CONTACTING PROCESS INVOLVING FLUIDIZED PARTICLES

Joseph B. McKinley, Pittsburgh, and Michael J. Derrig, Verona, Pa., assignors to Gulf Research & Development Company, Pittsburgh, Pa., a corporation of Delaware Application April 4, 1952, Serial No. 280,473

8 Claims. (Cl. 196—53)

This invention relates to a process involving fluidized particles.

It has proved desirable to contact fluidized particles with fluid charges comprising components which are at least partially in liquid phase and may be entirely in liquid phase at the contact conditions. Thus, for example, in processes such as hydrogenation, and catalytic cracking, such charges are frequently encountered. However, the treatment of such charges presents problems. Thus, over-wetting of the fluidized particles in a limited region of the fluid bed may occur. Not only does this favor deficient reaction conditions, but moreover, such over-wetting leads to clumping and agglomeration of the fluidized particles. In cases where extremely heavy stocks are introduced into the bed at high charge rates, classification of the fluid bed may result.

Attempts have been made to avoid introducing such charges directly into the fluid bed. Thus, in many conventional fluid operations like fluid catalytic cracking, such charges are contacted with dispersed phase catalyst in the transfer line from the regenerator leading to the reactor. The mixture of catalyst and liquid is then conducted to the fluid catalytic bed in the reactor. Inasmuch as the temperature of the catalyst returning to the reactor from the regenerator is ordinarily much higher than that desired for reaction, and the concentration of catalyst per unit volume is much less in the transfer line than it is in the reactor, excessive thermal, as distinguished from catalytic conversion of the liquid components of the charge takes place in the region where the contact with the catalyst is established.

It has been proposed to spray fluid charges containing components which are at least partially in liquid phase directly into a fluid bed by means of nozzles located directly in the fluid bed. This procedure is not fully satisfactory. Thus, as the liquid components are sprayed from the nozzle into the fluidized bed, the bed particles are wetted and collect on the nozzle. The collection of these particles forms large clumps on the nozzle, and not only interferes with the introduction of liquid to the fluidized bed, but also acts as a locus for improper reaction. Furthermore, when the clumps fall from the nozzle, they disrupt the fluid bed and may cause bed classification.

The process of our invention comprises the introduction into a bed of fluidized particles of a fluid charge comprising components which are at least partially in liquid phase at the contact conditions while avoiding the difficulties discussed above. This is accomplished by spraying the fluid charge through a shrouded nozzle directly onto the fluidized particles, and surrounding the spray with purge gas flowed through the shroud. It is essential that the purge gas have a sufficient linear velocity to prevent the fluidized particles from entering the shroud. In this manner collection of the fluidized particles on the nozzle is prevented, and the interface of fluidized particles at the base of the shroud constitutes a large area on which to spray the charge.

It is preferred to spray the charge in such a manner as to prevent the spray from contacting the internal shroud walls. This can ordinarily be effected by regulating the spray pattern so that during operating conditions the cross-sectional area of the spray from the nozzle measured at the base of the shroud is not more than about three-quarters the area of the base of the shroud. When the charge is sprayed in this manner onto the fluidized particles, the purge gas velocity through the shroud will ordinarily not have to be adjusted to aid in controlling the spray pattern. However, if there is some contact of the charge with the walls of the shroud when employing a purge gas velocity just sufficient to prevent the catalyst from entering the shroud, this contact can be prevented by increasing the purge gas velocity. It is desirable to prevent the spray from hitting the walls of the shroud for a number of reasons. Thus if the basal edges of the shroud become wetted, agglomeration of particles may occur at the edges. Moreover, such agglomeration may gradually build up within the shroud so as to ultimately plug the shroud. In addition, contact of the spray with the shroud walls leads to the deposition of solids on the shroud walls, which also may result in ultimate plugging of the shroud. Thus in the case of a hydrocarbon charge, contact of the sprayed charge with the shroud walls results in a build-up of coke upon the shroud walls. In the case of aqueous solutions, such as aqueous impregnating solutions containing dissolved salts, contact of the solution with the internal shroud walls may lead to deposition of the salt on the shroud walls.

Both sprays discharged from the nozzle as droplets, and sprays comprising thin solid streams of liquid which break up into droplets upon contact with the fluidized particles can be used. The maximum diameter of the droplets derived from the sprays should preferably be about the same diameter as that of the fluidized particles, although sprays containing somewhat larger droplets are satisfactory. When the size of the spray droplets is not larger than that of the fluidized particles or is smaller, the chance for any given liquid droplet wetting a number of fluidized particles is decreased. This is desirable as it materially reduces the possibility of particle agglomeration.

Any type of conventional nozzle which will produce a satisfactory spray of the liquid components of the charge is adequate for the purposes of our invention. The nozzle must be encompassed within a shroud so that the base of the shroud is beyond the nozzle orifice. Inasmuch as the spray exiting from the nozzle is ordinarily conical in shape, it is advantageous, although not absolutely necessary, to use a conical shroud conforming to the shape of the spray. However, other geometrical forms of shrouds can be employed, such as cylindrical shrouds, polygonal shrouds, hemispherical shrouds, etc. Moreover, the design of the shroud and its relation to the nozzle should be such that turbulence of the gas within the shroud is at a minimum. In this manner, the possibility of introduction of particles into the shroud from the fluidized bed is materially reduced.

Preferably, the nozzle should be directed downwardly. However, it may be directed at other angles, such as horizontally, obliquely, and upwardly. When the shrouded nozzle points upwardly, a higher rate of flow of purge gas through the shroud will be necessary to prevent catalyst from entering the shroud. The nozzle can be located at any height in the fluid bed. With mixed phase charges, the vapor phase components can be given a short catalyst contact time, if desired, by locating the nozzle high in the fluid bed. While the process of our invention can advantageously be operated in systems in which a single nozzle is employed, it is usually preferable to employ a number of nozzles. Advantageously, the nozzles are connected to a manifold carrying the charge. The shrouds surrounding each of the nozzles can also be connected to an additional manifold carrying the purge gas. While it is usually advantageous to add all of the charge through nozzles, in some cases it may prove advantageous to add but a portion of the charge through nozzles and to add the remainder of the charge usually with fluidizing gas by other means.

As exemplary of the process conditions of our invention, with fluidized particles having a density of the order of that of synthetic silica-alumina catalyst, and when introducing the charge through shrouds having a base diameter of up to about 2 feet, it is preferable to employ linear purge gas velocities through the shroud of the order of 2 to 15 feet per second (measured at the base of the shroud). A purge gas velocity in the upper portion of this range should be employed when the shroud is pointed upwardly, while a velocity in the lower portion of the range usually can be used when the shroud is pointed downwardly. In most cases purge gas linear velocities of about 5 to 10 feet per second are advantageous. The discharge rate for the liquid components of the charge through the nozzle varies with the absorptivity of the fluidized particles, and with their movement. In most cases, up to about 0.3 gallon of liquid per second per square foot of area at the base of the shroud can be added, with the rate of about 0.15 gallon per second per square foot of area being preferred.

The process of our invention is applicable to a wide variety of processes employing charges containing components which are at least partially in liquid phase at reaction conditions. Thus, for example, the process of our invention is applicable to the hydrogenation of high-boiling hydrocarbon charges such as heavy gas oils, reduced crude, topped crude, shale oils, coal oils, etc. By "hydrogenation" is meant processes such as those conducted in the presence of conventional hydrogenation catalysts and hydrogen-containing gas in which some degree of cracking of the charge is effected. Moreover, this term also includes "hydrodesulfurization," a process in which not only is the charge cracked, but also, its sulfur content is diminished. Examples of conventional hydrogenation catalysts suitable for the process of our invention include the group VIa and group VIII metals and metal compounds such as nickel, nickel oxide, nickel sulfide, iron, iron oxide, iron sulfide, cobalt, cobalt oxide, cobalt sulfide, molybdenum oxide, tungsten oxide, tungsten sulfide, cobalt molybdate, nickel tungstate, etc., either supported or unsupported on suitable bases or carriers such as alumina, silica-alumina, acid activated montmorillonites, etc. Conventional conditions for effecting the process of our invention when applied to hydogenation can be used. Such conditions comprise a temperature in the range of 750° F. to 950° F., and a pressure in the range of 250 to 2000 pounds per square inch.

Moreover, the process of our invention may also be applied to the catalytic cracking of high-boiling hydrocarbons such as those listed above. Such catalytic cracking is conventionally effected at a temperature in the range of 750° to 1000° F. and a pressure of about atmospheric to 100 pounds per square inch in the presence of suitable catalytic cracking catalysts. Examples of such suitable catalytic cracking catalysts include synthetic silica-alumina, synthetic silica-zirconia, activated clays such as acid activated montmorillonite clays, acid activated halloysite clays, etc.

In addition to the foregoing, the process of our invention can also be applied to the preparation of catalyst. Thus, for example, impregnating solutions such as aqueous solutions containing soluble impregnant metallic salts can be sprayed onto fluidized catalyst base particles. After subsequent drying to remove the impregnating solution, the catalyst may be reimpregnated and redried. In some cases, a single impregnating-drying cycle can be used. Catalysts prepared in this manner comprise superior impregnated catalysts inasmuch as uniform deposition of the impregnant upon the catalyst base particles is effected. Moreover, the preparation of large quantities of impregnated catalyst is facilitated by recourse to this method.

The accompanying figures which are hereby incorporated into our application and made a part thereof are as follows:

Figure 1 is a diagrammatic representation of an apparatus to be used in the process of our invention.

Figure 2 is a diagrammatic representation of a nozzle which can be employed in the process of our invention.

Figure 3 is a diagrammatic representation of another nozzle which can be employed in the process of our invention.

Figure 4 is a diagrammatic representation of an additional nozzle which can be employed in the process of our invention.

As an example of the process of our invention we shall disclose the application of our process to the preparation of impregnated catalysts. For this, reference should be had to the apparatus shown in accompanying Figure 1, which comprises a fluid reactor approximately 3 feet in diameter by 10 feet in height. Reactor 10 is filled for two-thirds of its height with an expanded fluidized catalyst base comprising synthetic silica-alumina microspheres. The volume of the expanded catalyst base is about 47 cubic feet. The expanded base is maintained fluidized at a fluid bed temperature of about 85° C. by a heated fluidizing gas consisting of air. The fluidizing gas is introduced through line 12 and valve 14 into the bottom of reactor 10 at such a rate as to give a linear velocity of about 0.3 foot per second in the fluid bed. An aqueous impregnating solution comprising a mixture of nickel nitrate and ammonium metatungstate which had been preheated to the fluid bed temperature of 85° C. is introduced through line 16 and manifold 18, through lines 20 and 22 to respective nozzles 24 and 26. Nozzles 24 and 26 are surrounded respectively by truncated conical shrouds 28 and 30. Purge gas is introduced to each of the shrouds 28 and 30 from line 32, manifold 34, and respective lines 36 and 38. The diameter of the base of each shroud is about 0.75 foot. The sprayed liquid is discharged from each of the nozzles 24 and 26 at a rate of about 0.2 gallon or less per second per square foot of area at the shroud base. Purge gas is passed through the shroud at a linear velocity of about 4 feet per second (measured at the base of the shroud). Under these conditions, the fluidized particles from the fluid bed are prevented from entering the shroud. Moreover, the spray pattern from nozzles 24 and 26 is regulated so that the sprayed liquid does not touch the internal walls of shrouds 28 and 30. The purge and fluidizing gases, as well as any volatilized moisture are removed from reactor 10 through cyclone separator 39, which returns entrained particles to the fluid bed.

The addition of liquid is continued until about 15 cubic feet of impregnating solution have been added. At this point the addition of solution is stopped and the temperature of the fluid bed gradually raised to about 125° C. by gradually raising the temperature of the fluidizing gas entering the reactor 10 through line 12 and valve 14. Volatilized moisture is removed from reactor 10 with the fluidizing gas through cyclone separator 39. If it is desirable to raise the level of impregnant on the catalyst base, the impregnation process can be repeated.

After the desired level of impregnant has been attained, the dried catalyst is removed from fluid reactor 10 through catalyst draw-off 40 and the catalyst calcined at an elevated temperature such as about 1000° to 1300° F. in external equipment (not shown). After the impregnated particles have been calcined, they can be employed as hydrogenation catalyst.

In the foregoing example, the fluid charge comprising the impregnating solution was introduced in substantially liquid phase. Under these conditions a nozzle of the type shown in accompanying Figure 2 is especially suitable. Liquid is charged to the nozzle from pipe 50. The charged liquid is imparted a circular motion on striking vanes 52 and spirals down the side of the nozzle to orifice 54 from which it is discharged as a hollow conical spray. If there is a hole through the center member supporting the vanes, part of the liquid jets through this opening and a solid conical spray is produced.

Where the fluid charge is in the liquid phase or in the mixed phase with a major portion in the liquid phase, a spray nozzle of the type shown in accompanying Figure 3 is suitable. The mixed phase charge is passed through center member 60 of the nozzle. Purge gas similar to the gas used in the shroud is flowed through the annular space 62. The charge from center member 60 and the gas from annular space 62 are mixed in chamber 64 before discharging through orifice 66. In nozzles of this type, it is advantageous to taper both the end of the center member 60 and the end of the tube enclosing annular space 62 at an angle of about 30°.

Where the fluid charge is in mixed phase and comprises a major portion of vapor, a nozzle of the type shown in accompanying Figure 4 is suitable. The mixed phase charge is passed through a tube 70 terminating in a venturi 72 prior to the orifice 74. Intimate mixing of the gas and liquid phases is accomplished by maintaining turbulent flow in tube 70 leading up to venturi 72. The turbulence is increased in venturi 72 so that the spray discharged from orifice 74 comprises an intimate mixture of gas and liquid. It is preferred that the included angle for the entrance to the venturi be about 30° and an included angle for the exit of the venturi be about 7°.

An example of mixed phase operation is encountered in the hydrodesulfurization of a topped West Texas crude. Suitable operating conditions for the hydrodesulfurization are a temperature of about 840° F. and a pressure of about 500 pounds per square inch. Under these conditions the charge is in mixed phase with about 75 percent of the charge being in liquid phase. A suitable hydrodesulfurization catalyst for this operation comprises a nickel tungstate on alumina catalyst having about 10 weight percent of nickel tungstate. Under the reaction conditions the dense phase fluid catalytic bed has an apparent density while in the fluidized state of about 0.8 gram per cubic centimeter. The charge is advantageously fed to the reactor at a rate of about one weight of charge per weight of catalyst per hour. Hydrogen is supplied in the form of hydrogen-containing gas at a rate of about 25,000 cubic feet of hydrogen (measured at standard temperature and pressure) per barrel of liquid charge.

The operation can advantageously be carried out in a reactor similar to that shown diagrammatically in Figure 1. The reactor is 16 feet in length, 8 feet in diameter and two-third full of expanded catalyst, and contains six shrouded nozzles in the form of two systems comprising three manifolded shrouded nozzles each. Each of the shrouds is conical in form and has a base diameter of one foot. The type of nozzle employed in the instant example is that shown in Figure 3. About 5 percent of the hydrogen-containing gas supplied to the reactor is used as atomization gas and is flowed through the annular space surrounding the center member of the nozzle. About 55 to 60 percent of the hydrogen supplied to the reactor is added in the form of purge gas for the shrouds. The balance of the hydrogen is introduced at the bottom of the fluidized bed.

At the pressure indicated, a gradual build-up of carbonaceous contaminants on the catalyst is effected after a period of on-stream operation. It is then desirable to regenerate the catalyst. This is advantageously accomplished by conventional oxidative regeneration in which the carbonaceous contaminants are removed through burning with an oxygen-containing gas such as an air-flue gas mixture at an elevated temperature such as about 900° to 1300° F. To effect regeneration, introduction of the charge is terminated, and the catalyst removed from the fluid reactor, stripped of residual hydrocarbons, and passed to a conventional regenerator wherein the carbonaceous contaminants are removed by burning with an oxygen-containing gas. If desired, the regeneration can be effected at a lower pressure than that employed in the on-stream reactor.

In operations such as the foregoing which are intermittently terminated to permit regeneration, it is advantageous to terminate the on-stream cycle by introducing almost completely vaporized stock through the nozzles and thus effect a purging of heavy liquids from the nozzles. Moreover, it is also desirable to maintain a flow of gas through the nozzles at all times to prevent them from becoming filled with catalyst.

In some cases, particularly where elevated reaction pressures are used, the build-up of carbonaceous contaminants on the catalyst is insufficient to require regeneration. In such cases, sustained periods of on-stream operation can be employed. After prolonged operation, there is a gradual deactivation of the catalyst, and ultimate replacement of the catalyst inventory usually becomes necessary.

While the foregoing embodiments of our process constitute preferred operating procedure, it is obvious that our process may be modified by one skilled in the art. It is to be understood that these modifications constitute a part of our invention and are to be considered as included within the appended claims. By way of example, other arrangments of shrouded nozzle systems and other forms of shrouded nozzles such as those readily apparent to one skilled in the art can be employed in the process of our invention. Our process can be used for other reactions than those specified above. Moreover, while we have shown the application of our process to fixed fluid bed operations, it can be applied to moving fluid bed operations in which fluidized particles are continuously withdrawn from the reactor.

In addition to the foregoing, while the shrouded nozzle can be located in the dense phase fluid bed as in accompanying Figure 1, it can also be located on the wall of the fluid reactor as shown in our United States application for Letters Patent, Serial No. 280,472 filed on even date.

The utilization of the process of our invention permits the facile contact of fluidized particles and charges which are at least partially in liquid phase and may be entirely in liquid phase at the conditions present in the fluid reactor. In the process of our invention, charges are introduced directly into the fluid bed and intimate uniform contact with the dense phase fluidized particles of the fluid bed established. Moreover, both improper reaction and agglomeration of the fluidized particles are avoided.

Obviously many modifications and variations of the invention as hereinbefore set forth may be made without departing from the spirit and scope thereof, therefore, only such limitations should be imposed as are indicated in the appended claims.

We claim:

1. A process for contacting a fluid charge with fluidized particles, said fluid charge comprising components which are at least partially in liquid phase at the contact conditions, which comprises spraying said fluid charge through a shrouded nozzle onto said fluidized particles, surrounding said spray with purge gas from the shroud, said purge gas having a sufficient linear velocity to prevent the fluidized particles from entering the shroud.

2. A process for contacting a fluid charge with fluidized particles, said fluid charge comprising components which are at least partially in liquid phase at the contact conditions, which comprises spraying said fluid charge through a shrouded nozzle onto said fluidized particles, preventing said spray from contacting the shroud, surrounding said spray with purge gas from the shroud, said purge gas having a sufficient linear velocity to prevent the fluidized particles from entering the shroud.

3. A process for contacting a fluid charge with fluidized particles, said fluid charge comprising components which are at least partially in liquid phase at the contact conditions, which comprises spraying droplets of said fluid charge through a shrouded nozzle onto said fluidized particles, each of said sprayed droplets having a size not larger than each of the fluidized particles, preventing the sprayed droplets from contacting the shroud, surrounding said sprayed droplets with purge gas from the shroud, said purge gas having a sufficient linear velocity to prevent the fluidized particles from entering the shroud.

4. A process for contacting a fluid charge with fluidized particles, said fluid charge comprising components which are at least partially in liquid phase at the contact conditions, which comprises spraying said fluid charge through a shrouded nozzle onto said fluidized particles at a rate of not more than about 0.3 gallon of liquid per second per square foot of area at the shroud base, preventing the spray from contacting the shroud, surrounding said spray with purge gas from the shroud, said purge gas having a linear velocity of about 2 to 15 feet per second measured at the shroud base, and maintaining the area of the spray at the base of the shroud at less than 75 percent of the shroud base area.

5. A process for contacting a fluid charge with fluidized particles, said fluid charge comprising components which are at least partially in liquid phase at the contact conditions, which comprises spraying said fluid charge through a shrouded nozzle onto said fluidized particles at a rate of about 0.15 gallon of liquid per second per square foot of area at the shroud base, preventing the spray from contacting the shroud, surrounding said spray with purge gas from the shroud, said purge gas having a linear velocity of about 5 to 10 feet per second measured at the shroud base, and maintaining the area of the spray at the base of the shroud at less than 75 percent of the shroud base area.

6. A hydrogenation process in which a fluid hydrocarbon charge is hydrogenated by being contacted with fluidized hydrogenation catalyst particles in the presence of hydrogen, said fluid hydrocarbon charge comprising components which are at least partially in liquid phase at the contact conditions, which comprises spraying said fluid hydrocarbon charge through a shrouded nozzle onto said fluidized hydrogenation catalyst particles, preventing the spray from contacting the shroud, surrounding said spray with hydrogen-containing gas from the shroud, said hydrogen-containing gas having a sufficient linear velocity to prevent the fluidized hydrogenation catalyst particles from entering the shroud.

7. A hydrogenation process in which a high-boiling hydrocarbon charge is contacted with fluidized hydrogenation catalyst particles in the presence of a hydrogen-containing gas at reaction conditions comprising a temperature in the range of 750° to 950° F. and a pressure in the range of 250 to 2000 pounds per square inch, said high-boiling hydrocarbon charge comprising components which are at least partially in liquid phase at the reaction conditions, which comprises fluidizing the hydrogenation catalyst particles by means of a hydrogen-containing gas, spraying the hydrocarbon charge through a shrouded nozzle onto said fluidized catalyst particles, preventing the spray from contacting the shroud, surrounding said spray with hydrogen-containing gas from the shroud, said hydrogen-containing gas having a sufficient linear velocity to prevent the fluidized catalyst particles from entering the shroud.

8. A process for preparing impregnated catalyst from a fluid impregnant comprising components which are substantially in liquid phase at the catalyst preparation conditions which comprises spraying said fluid impregnant through a shrouded nozzle onto fluidized catalyst base particles, preventing the spray from contacting the shroud, surrounding said spray with purge gas from the shroud, said purge gas having a sufficient linear velocity to prevent the fluidized catalyst base particles from entering the shroud.

References Cited in the file of this patent
UNITED STATES PATENTS

| | | |
|---|---|---|
| 2,423,833 | Hirsch | July 15, 1947 |
| 2,493,035 | Savage | Jan. 3, 1950 |
| 2,556,514 | Bergstrom | June 12, 1951 |
| 2,593,495 | Shimp | Apr. 22, 1952 |
| 2,602,771 | Munday et al. | July 8, 1952 |